US012606177B2

(12) United States Patent
Omi et al.

(10) Patent No.: US 12,606,177 B2
(45) Date of Patent: Apr. 21, 2026

(54) DRIVER MONITORING DEVICE, DRIVER MONITORING METHOD, AND NON-TRANSITORY RECORDING MEDIUM

(71) Applicants: TOYOTA JIDOSHA KABUSHIKI KAISHA, Toyota (JP); AISIN CORPORATION, Aichi (JP)

(72) Inventors: Takuhiro Omi, Anjo (JP); Hiroshi Morimoto, Tokyo-to (JP); Kenta Yamada, Tokyo-to (JP); Udara Eshan Manawadu, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 47 days.

(21) Appl. No.: 18/614,890

(22) Filed: Mar. 25, 2024

(65) Prior Publication Data

US 2024/0336269 A1      Oct. 10, 2024

(30) Foreign Application Priority Data

Apr. 4, 2023    (JP) ................................. 2023-060681

(51) Int. Cl.
B60W 40/08 (2012.01)
B60W 60/00 (2020.01)
(Continued)

(52) U.S. Cl.
CPC .......... B60W 40/08 (2013.01); B60W 60/001 (2020.02); G06V 20/597 (2022.01);
(Continued)

(58) Field of Classification Search
CPC .............. B60W 40/08; B60W 60/001; B60W 2540/229; B60W 2540/223; B60W 2040/0827; B60W 2420/403; G06V 40/174; G06V 40/171; G06V 20/597; G06V 40/20
(Continued)

(56) References Cited

U.S. PATENT DOCUMENTS 10,241,509 B1 *   3/2019  Fields ................... B60K 35/85
2008/0212828 A1    9/2008  Ishida et al.
(Continued)

FOREIGN PATENT DOCUMENTS

JP        2009-045418 A      3/2009
JP        2011-048531 A      3/2011
(Continued)

*Primary Examiner* — Naomi J Small
(74) *Attorney, Agent, or Firm* — Sughrue Mion, PLLC

(57) ABSTRACT

A driver monitoring device has vehicle control part performing autonomous driving control of a vehicle, first determination part performing first determination of whether there is a possibility of a driver of the vehicle being in a sleeping state or strongly drowsy state, and second determination part performing second determination of whether the driver is using an electronic device based on an image including a face of the driver and behavioral feature information showing a difference between a behavioral feature of the driver when the driver is in the sleeping state or strongly drowsy state and the behavioral feature of the driver when the driver is using the electronic device.

12 Claims, 4 Drawing Sheets

(51) Int. Cl.
| | | |
|---|---|---|
| *G06V 20/59* | (2022.01) |
| *G06V 40/16* | (2022.01) |
| *G06V 40/20* | (2022.01) |

(52) U.S. Cl.
CPC .......... *G06V 40/171* (2022.01); *G06V 40/174* (2022.01); *G06V 40/20* (2022.01); *B60W 2040/0827* (2013.01); *B60W 2420/403* (2013.01); *B60W 2540/223* (2020.02); *B60W 2540/229* (2020.02)

(58) Field of Classification Search
USPC ........................................................ 340/576
See application file for complete search history.

(56) References Cited

U.S. PATENT DOCUMENTS

| | | | |
|---|---|---|---|
| 2019/0213429 A1* | 7/2019 | Sicconi .................. | G06V 40/18 |
| 2020/0334477 A1 | 10/2020 | Aoi et al. | |
| 2021/0064121 A1* | 3/2021 | Ota ......................... | H04L 12/40 |
| 2021/0107479 A1* | 4/2021 | Limbacher ............ | B60W 40/08 |
| 2021/0362750 A1* | 11/2021 | Yang ..................... | B60W 40/08 |

FOREIGN PATENT DOCUMENTS

| | | |
|---|---|---|
| JP | 2020-010865 A | 1/2020 |
| WO | 2017/209225 A1 | 12/2017 |

* cited by examiner

DRIVER MONITORING DEVICE, DRIVER MONITORING METHOD, AND NON-TRANSITORY RECORDING MEDIUM

FIELD

The present disclosure relates to driver monitoring device, driver monitoring method, and non-transitory recording medium.

BACKGROUND

PTL 1 (Japanese Unexamined Patent Publication No. 2011-048531) describes a drowsiness detection device for detecting drowsiness of a subject. In the art described in PTL 1, whether eyes of a subject are drowsy eyes is determined and whether a change of an angle of facial orientation occurs right after movement of eyelids of the subject occurs is determined. Further, PTL 1 describes that drowsy eyes are eyes in a state half closed or a state closed for a predetermined time period or more, that it is determined that the eyes of a driver are not drowsy eyes (the eyes of the driver are downward gazing, etc.) when the change of the angle of the facial orientation occurs right after the movement of the eyelids of the driver occurs, etc.

An image of the face of the driver captured by a driver monitor camera when the driver is using an electronic device in a vehicle becomes an image similar to an image of the face of the driver captured by the driver monitor camera when the driver is in a sleeping state or strongly drowsy state.

On the other hand, in the art described in PTL 1, it is not determined whether the driver is using the electronic device. For this reason, in the art described in PTL 1, it is liable to end up being mistakenly determined that the driver is in the sleeping state or strongly drowsy state while the driver is using the electronic device.

SUMMARY

In consideration of the above-mentioned point, the present disclosure has as its object the provision of driver monitoring device, driver monitoring method, and non-transitory recording medium enabling discrimination between when a driver of a vehicle is using an electronic device and when the driver is in a sleeping state or strongly drowsy state.

(1) One aspect of the present disclosure is a driver monitoring device including a processor configured to: perform autonomous driving control of a vehicle; perform first determination of whether there is a possibility of a driver of the vehicle being in a sleeping state or strongly drowsy state; and perform second determination of whether the driver is using an electronic device, wherein the processor is configured to perform the second determination based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

(2) In the driver monitoring device of the aspect (1), the processor may be configured to perform the second determination while performing the autonomous driving control of a level enabling the driver to use the electronic device.

(3) In the driver monitoring device of the aspect (1) or (2), the processor may be configured to perform the second determination when determining that there is the possibility of the driver being in the sleeping state or strongly drowsy state.

(4) In the driver monitoring device of any one of the aspects (1) to (3), the processor may be configured to perform the second determination taking a longer time than the time taken in the first determination when determining that there is the possibility of the driver being in the sleeping state or strongly drowsy state.

(5) In the driver monitoring device of any one of the aspects (1) to (4), the behavioral feature of the driver when the driver is in the sleeping state or strongly drowsy state may include at least one of a head of the driver being tilted backward, the driver greatly and quickly shaking the driver's head to fight off drowsiness, the driver breathing deeply, an action of the driver corresponding to a microsleep event, and relaxation of facial muscles of the driver, and the behavioral feature of the driver when the driver is using the electronic device may include at least one of upper eyelids of the driver moving up and down when the driver follows text displayed on a screen of the electronic device with the driver's eyes, neck of the driver moving to the left or right when the driver follows the text displayed on the screen of the electronic device with the driver's eyes, only one of right shoulder and left shoulder of the driver moving to the left and right when the driver holds the electronic device with one of right hand and left hand of the driver and operates the electronic device with the other of the right hand and the left hand of the driver, a mouth of the driver moving along with speech of the driver, and facial expression of the driver changing.

(6) In the driver monitoring device of any one of the aspects (1) to (5), the processor may be configured to detect a change in the distance between eyebrows and upper eyelids of the driver in the image and, when the distance between the eyebrows and the upper eyelids of the driver in the image changes, the processor may be configured to determine that the driver is using the electronic device more easily than when the distance between the eyebrows and the upper eyelids of the driver in the image does not change.

(7) In the driver monitoring device of any one of the aspects (1) to (6), the processor may be configured to detect repetition of movement in the horizontal direction of facial orientation of the driver in the image and, when the movement in the horizontal direction of the facial orientation of the driver in the image is repeated, the processor may be configured to determine that the driver is using the electronic device more easily than when the movement in the horizontal direction of the facial orientation of the driver in the image is not repeated.

(8) In the driver monitoring device of any one of the aspects (1) to (7), the processor may be configured to detect left-right asymmetry of the positions and movement of right shoulder and left shoulder of the driver in the image and, when the positions and the movement of the right shoulder and the left shoulder of the driver in the image are left-right asymmetric, the processor may be configured to determine that the driver is using the electronic device more easily than when the positions and the movement of the right shoulder and the left shoulder of the driver in the image are not left-right asymmetric.

(9) In the driver monitoring device of any one of the aspects (1) to (8), the processor may be configured to analyze movement of a mouth of the driver from the image including the face of the driver and, when analyzing that the driver is speaking, the processor may be configured to determine that the driver is using the electronic device more easily than when analyzing that the driver is not speaking.

(10) In the driver monitoring device of any one of the aspects (1) to (9), the processor may be configured to use a facial action coding system (FACS) to detect a facial expression or the driver and, when using the facial action coding system to detect a change of the facial expression of the driver, the processor may be configured to determine that the driver is using the electronic device more easily than when the change of the facial expression of the driver is not detected.

(11) Another aspect of the present disclosure is a driver monitoring method including: performing autonomous driving control of a vehicle; performing first determination of whether there is a possibility of a driver of the vehicle being in a sleeping state or strongly drowsy state; and performing second determination of whether the driver is using an electronic device, wherein the second determination is performed based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

(12) Still another aspect of the present disclosure is a non-transitory recording medium having recorded thereon a computer program for causing a processor to execute a process including: performing autonomous driving control of a vehicle; performing first determination of whether there is a possibility of a driver of the vehicle being in a sleeping state or strongly drowsy state; and performing second determination of whether the driver is using an electronic device, wherein the second determination is performed based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

According to the present disclosure, it is possible to discriminate when the driver of the vehicle is using the electronic device and when the driver is in the sleeping state or strongly drowsy state.

DESCRIPTION OF EMBODIMENTS

Figure 1:
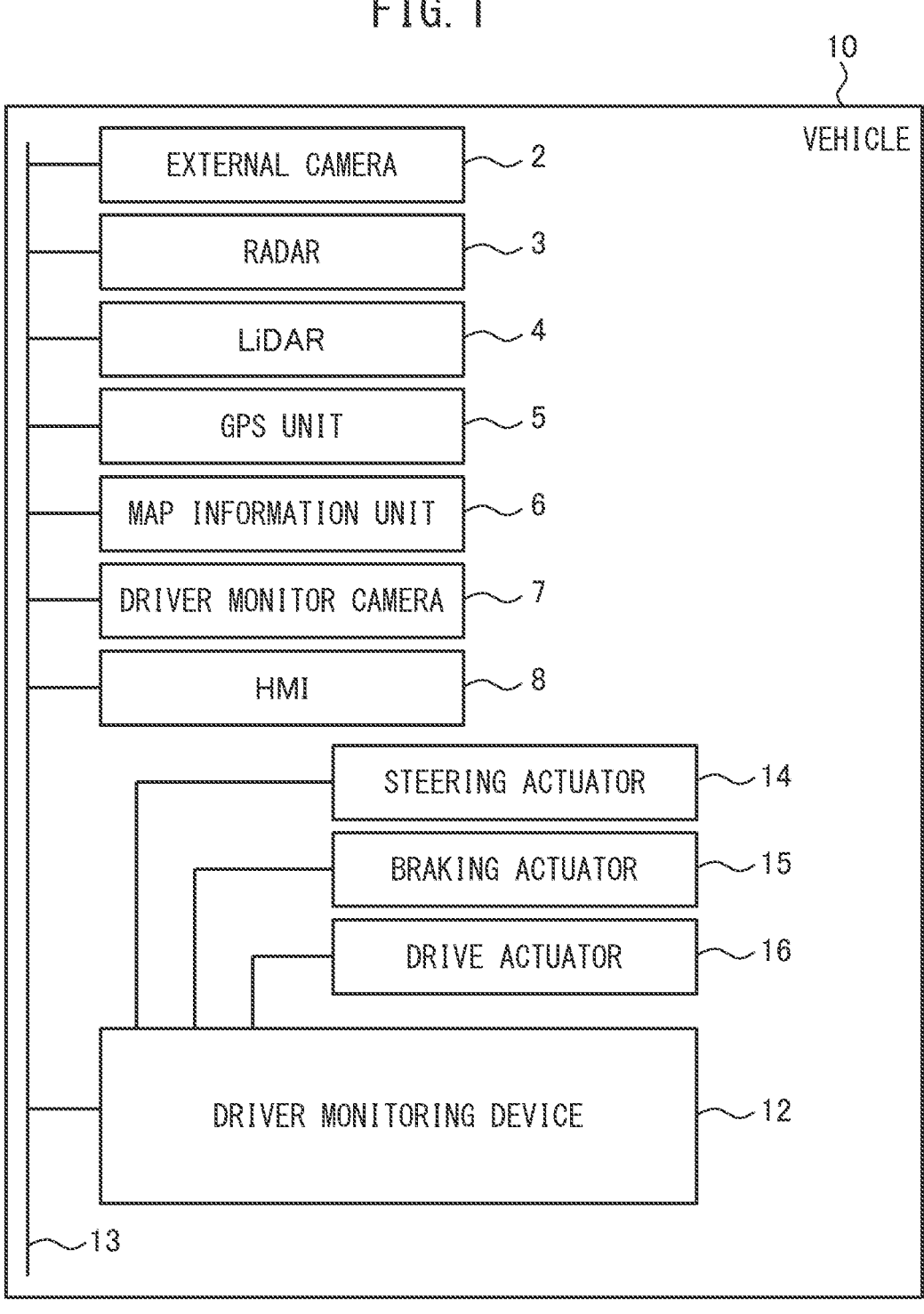
FIG. 1 is a view showing one example of the schematic configuration of a vehicle 10 to which a driver monitoring device 12 of a first embodiment is applied.

Below, referring to the drawings, embodiments of driver monitoring device, driver monitoring method, and non-transitory recording medium of the present disclosure will be explained.

First Embodiment

Figure 2:
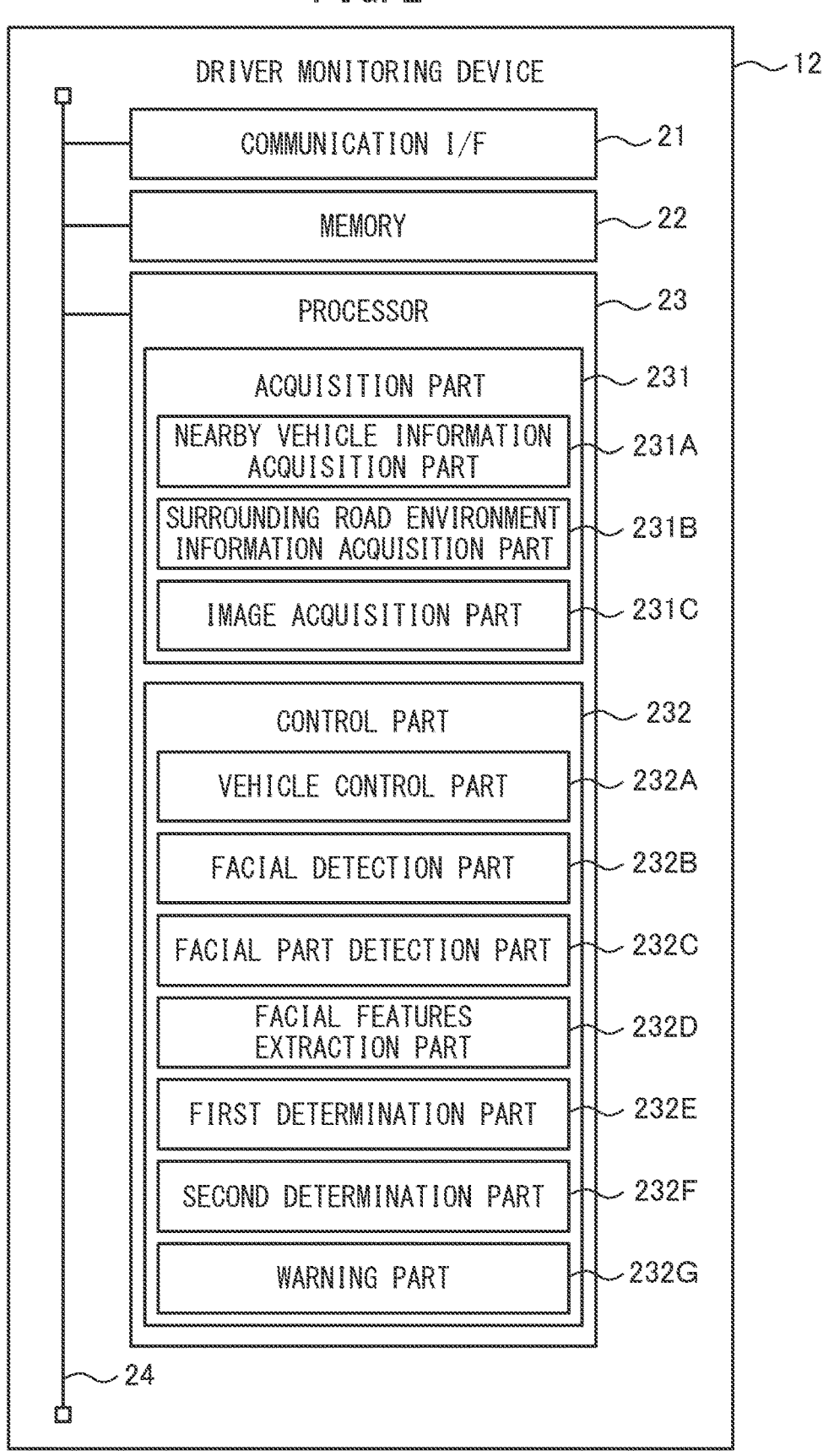
FIG. 2 is a view showing one example of the specific configuration of the driver monitoring device 12 shown in FIG. 1.

FIG. 1 is a view showing one example of the schematic configuration of a vehicle 10 to which a driver monitoring device 12 of a first embodiment is applied. FIG. 2 is a view showing one example of the specific configuration of the driver monitoring device 12 shown in FIG. 1.

In the example shown in FIG. 1 and FIG. 2, the vehicle 10 is provided with external camera 2, radar 3, LiDAR (Light Detection And Ranging) 4, and driver monitoring device 12. The external camera 2 captures an image showing nearby vehicles of the vehicle 10 and road environment (for example, road structure, rules, etc.) in surrounding region of the vehicle 10 and generates and sends image data showing the nearby vehicles and the road environment in the surrounding region to the driver monitoring device 12. The radar 3 is, for example, a millimeter wave radar, detects relative positions and relative speeds of the nearby vehicles and the road structure in the surrounding region with respect to the vehicle 10, and sends the results of detection to the driver monitoring device 12. The LiDAR 4 detects the relative positions and the relative speeds of the nearby vehicles and the road structure in the surrounding region with respect to the vehicle 10 and sends the results of detection to the driver monitoring device 12.

The external camera 2, the radar 3, and the LiDAR 4 detect objects other than the vehicle 10 to thereby detect the possibility of collision of the vehicle 10.

Further, the vehicle 10 is provided with GPS (global positioning system) unit 5 and map information unit 6. The GPS unit 5 acquires position information showing current position of the vehicle 10 based on GPS signal and sends the position information of the vehicle 10 to the driver monitoring device 12. The map information unit 6 is, for example, formed inside HDD (hard disk drive), SSD (solid state drive), or other storage mounted in the vehicle 10. Map information of the map information unit 6 includes the road structure (position of the road, shape of the road, lane structure, etc.), rules, and various other information.

Furthermore, the vehicle 10 is provided with driver monitor camera 7 and HMI (human machine interface) 8. The driver monitor camera 7 captures an image including a face of the driver of the vehicle 10.

Figure 3:
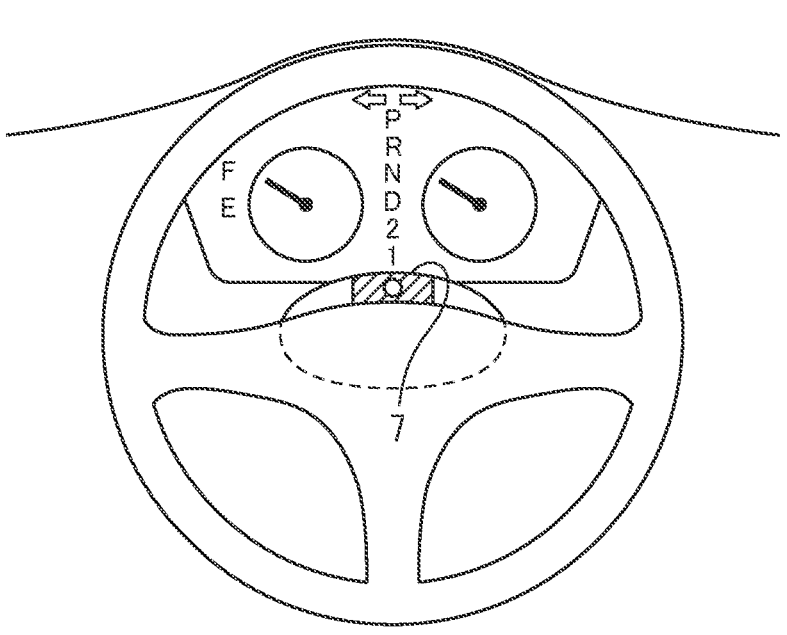
FIG. 3 is a view showing one example of the arrangement of a driver monitor camera 7 shown in FIG. 1.

FIG. 3 is a view showing one example of the arrangement of the driver monitor camera 7 shown in FIG. 1.

In the example shown in FIG. 1 to FIG. 3, the driver monitor camera 7 is arranged above a steering column (not shown) of the vehicle 10 so that it can capture the face and part of the upper torso of the driver. More specifically, an imaging region of the driver monitor camera 7 includes right shoulder and left shoulder of the driver, but does not include right wrist and left wrist of the driver.

In another example, the driver monitor camera 7 may be arranged at a center cluster of the vehicle 10 or the driver monitor camera 7 may be arranged at room mirror, instrument panel, instrument hood or the like of the vehicle 10. In these examples as well, the right wrist and the left wrist of the driver are not included in the imaging region of the driver monitor camera 7.

In the example shown in FIG. 1 and FIG. 2, the HMI 8 is an interface for input and output of information between the driver monitoring device 12 and the driver. The HMI 8 includes an information provision device for providing various information to the driver. Specifically, the information provision device includes a display for displaying text, images, etc., a speaker for outputting speech, etc. Further, the HMI 8 is provided with microphone for receiving voice input of the driver, operating buttons, touch panel, etc. for receiving input operations of the driver.

The external camera 2, the radar 3, the LiDAR 4, the GPS unit 5, the map information unit 6, the driver monitor camera 7, the HMI 8, and the driver monitoring device 12 are connected through an internal vehicle network 13.

Further, the vehicle 10 is provided with steering actuator 14, braking actuator 15, and drive actuator 16. The steering actuator 14, for example, includes power steering system, steer-by-wire system, rear wheel steering system, or the like. The braking actuator 15 has the function of causing the vehicle 10 to decelerate. The braking actuator 15, for example, includes hydraulic brake, power regeneration brake or the like. The drive actuator 16 has the function of causing the vehicle 10 to accelerate. The drive actuator 16, for example, includes an engine, EV (electric vehicle) system, hybrid system, fuel cell system, or the like.

In the example shown in FIG. 1 and FIG. 2, the driver monitoring device 12 is configured by an autonomous driving ECU. The driver monitoring device 12 (autonomous driving ECU) is able to control the vehicle 10 by a driving control level of the level 3 defined by the SAE (Society of Automotive Engineers), i.e., the driving control level in which operation of the steering actuator 14, the braking actuator 15, and the drive actuator 16 and monitoring of the surroundings of the host vehicle 10 by the driver are not required. Further, the driver monitoring device 12 (the autonomous driving ECU) has the function of controlling the vehicle 10 by a driving control level in which the driver is involved in driving of the host vehicle 10, for example, driving control levels of the levels 0 to 2 defined by the SAE.

In autonomous driving of the level 3 defined by the SAE, at the time of system operation, secondary activity (eating and drinking, smartphone operation, movie viewing, etc.) is allowed to the driver of the vehicle 10, but falling asleep and greatly reclining the driver's seat are not allowed to the driver because they make smooth response to take-over request impossible. More specifically, the driver of the vehicle 10 has to constantly maintain a state in which the driver can return to driving in accordance with the take-over request. For this reason, the driver monitoring device 12 uses the driver monitor camera 7 to constantly monitor whether the driver is maintaining the state suitable for the take-over request. Specifically, the driver monitoring device 12 monitors whether the driver is in the state (available state) in which the driver can return to driving within a certain time period. For example, when the driver is in a state in which the driver is sitting on the driver's seat and wearing a seat belt and the driver is not sleeping, the driver monitoring device 12 determines that the driver is in the available state.

A technique in which the driver has to press a button at regular intervals may be considered so that the driver monitoring device 12 determines that the driver is in the available state. However, this technique is not suitable because a bothersome operation (operation of pressing the button) ends up being forced on the driver although the secondary activity is allowed to the driver.

Therefore, in the example shown in FIG. 1 and FIG. 2, the driver monitoring device 12 has the function of using the image including the face of the driver captured by the driver monitor camera 7 so as to detect whether the driver is in a sleeping state. In more detail, the driver monitoring device 12 has an eye opening/closing detection function of the driver of the vehicle 10.

If the driver monitor camera 7 is arranged above the steering column of the vehicle 10 (example shown in FIG. 3) or if the driver monitor camera 7 is arranged at the center cluster of the vehicle 10, the driver monitoring device 12 cannot detect an opened/closed state of the eyes of the driver based on the image including the face of the driver captured by the driver monitor camera 7 when the driver is nodding, so it is not possible to accurately estimate whether the driver is in the sleeping state.

Further, if the driver monitor camera 7 is arranged above the steering column of the vehicle 10 or if the driver monitor camera 7 is arranged at the center cluster of the vehicle 10, the driver monitor camera 7 cannot capture the image including the wrists of the driver due to restrictions of angle of view.

On the other hand, as explained above, in the autonomous driving of the level 3 defined by the SAE, use of an electronic device by the driver of the vehicle 10 (for example, the smartphone operation, the movie viewing using a tablet terminal, etc.) is allowed.

Therefore, it is necessary to be able to discriminate whether the driver of the vehicle 10 is, for example, nodding and sleeping (in the sleeping state or strongly drowsy state) or the driver of the vehicle 10 is using the electronic device. Considering this point, in the driver monitoring device 12 of the first embodiment, the later explained countermeasures are being taken.

In the example shown in FIG. 1 and FIG. 2, the driver monitoring device 12 is configured by a microcomputer provided with communication interface (I/F) 21, memory 22, and processor 23. The communication interface 21, the memory 22, and the processor 23 are connected through signal lines 24. The communication interface 21 has an interface circuit for connecting the driver monitoring device 12 to the internal vehicle network 13. The memory 22 is one example of a storage part and, for example, has a volatile semiconductor memory and a nonvolatile semiconductor memory. The memory 22 stores programs used in processing performed by the processor 23 and various data. The processor 23 has the function of performing the autonomous driving of the level enabling the driver of the vehicle 10 to use the electronic device (for example, the autonomous driving of the level 3 defined by the SAE) etc.

In the example shown in FIG. 1 and FIG. 2, the driver monitoring device 12 is provided with a single processor 23, but in another example, the driver monitoring device 12 may be provided with several processors. Further, in the example shown in FIG. 1 and FIG. 2, the driver monitoring device 12 is configured by a single ECU (the autonomous driving ECU), but in another example, the driver monitoring device 12 may be configured by several ECUs (the autonomous driving ECU and an ECU other than the autonomous driving ECU).

In the example shown in FIG. 1 and FIG. 2, the processor 23 is provided with acquisition part 231 and control part 232. The acquisition part 231 is provided with nearby vehicle information acquisition part 231A, surrounding road environment information acquisition part 231B, and image acquisition part 231C.

The nearby vehicle information acquisition part 231A acquires nearby vehicle information which is information showing position, speed, etc. of the nearby vehicle of the vehicle 10 from the external camera 2, the radar 3, and the LiDAR 4. In more detail, the nearby vehicle information acquisition part 231A has the function of recognizing the position, the speed, etc. of the nearby vehicle of the vehicle 10 based on the information sent from the external camera 2, the radar 3, and the LiDAR 4.

The surrounding road environment information acquisition part 231B acquires surrounding road environment information which is information showing surrounding road environment of the vehicle 10. In more detail, the surrounding road environment information acquisition part 231B has the function of recognizing the road structure, the rules, etc. in the vicinity of the vehicle 10 based on the information sent from the external camera 2, the radar 3, and the LiDAR 4. Further, the surrounding road environment information acquisition part 231B has the function of recognizing the road structure, the rules, etc. in the vicinity of the vehicle 10 based on the map information sent from the map information unit 6.

The image acquisition part 231C acquires the image including the face of the driver of the vehicle 10 captured by the driver monitor camera 7.

The control part 232 is provided with vehicle control part 232A, facial detection part 232B, facial part detection part 232C, facial features extraction part 232D, first determination part 232E, second determination part 232F, and warning part 232G.

The vehicle control part 232A performs autonomous driving control of the vehicle 10. In more detail, the vehicle control part 232A has the function of performing the autonomous driving control of the level enabling the driver of the vehicle 10 to use the electronic device. The vehicle control part 232A can, for example, control the vehicle 10 by the driving control level of the level 3 defined by the SAE.

The facial detection part 232B, for example, uses a known facial recognition technology such as facial recognition AI (artificial intelligence) etc. to thereby detect the face of the driver of the vehicle 10 included in the image captured by the driver monitor camera 7.

The facial part detection part 232C uses a known facial part detection technology to detect facial parts (for example, the eyes, nose, mouth, etc.) of the driver of the vehicle 10 from the face of the driver of the vehicle 10 detected by the facial detection part 232B.

The facial features extraction part 232D uses a known facial features extraction technology to extract facial features of the driver of the vehicle 10 from the face of the driver of the vehicle 10 detected by the facial detection part 232B. Further, the facial features extraction part 232D uses the results of processing of the facial part detection part 232C and a known facial orientation detection technology to detect orientation of the face of the driver of the vehicle 10.

The first determination part 232E performs first determination of whether there is a possibility of the driver of the vehicle 10 being in the sleeping state or strongly drowsy state based on the results of detection of facial orientation of the driver of the vehicle 10 etc. by the facial features extraction part 232D.

Specifically, the first determination part 232E uses a known sleep detection technology to determine whether there is the possibility of the driver of the vehicle 10 being in the sleeping state or strongly drowsy state.

For example, when the eyes of the driver of the vehicle 10 included in the image captured by the driver monitor camera 7 appear to be closed, when the head of the driver of the vehicle 10 included in the image captured by the driver monitor camera 7 tilts forward, when movement of the whole body of the driver such as vertical movement of shoulders of the driver of the vehicle 10 included in the image captured by the driver monitor camera 7 exists, when the mouth of the driver of the vehicle 10 included in the image captured by the driver monitor camera 7 moves, when the driver of the vehicle 10 included in the image captured by the driver monitor camera 7 touches the face with the driver's hand, when facial movement like nodding of the driver of the vehicle 10 included in the image captured by the driver monitor camera 7 exists, etc., the first determination part 232E determines that there is the possibility of the driver of the vehicle 10 being in the sleeping state or strongly drowsy state.

On the other hand, not only the eyes of the driver of the vehicle 10 included in the image captured by the driver monitor camera 7 appear to be closed when the driver is in the sleeping state or strongly drowsy state, but also the eyes of the driver of the vehicle 10 included in the image captured by the driver monitor camera 7 appear be closed when the driver is looking downward (i.e., is in a state in which the driver's face is facing forward and the driver is gazing downward) and using the electronic device (for example operating a smartphone, viewing a movie using a tablet terminal, etc.)

Further, not only the head of the driver of the vehicle 10 included in the image captured by the driver monitor camera 7 tilts forward when the driver is in the sleeping state or strongly drowsy state, but also the head of the driver of the vehicle 10 included in the image captured by the driver monitor camera 7 tilts forward when the driver is using the electronic device.

Not only the movement of the whole body of the driver who fights off drowsiness such as the vertical movement of the shoulders of the driver included in the image captured by the driver monitor camera 7 exists when the driver is in the strongly drowsy state, but also the movement of the whole body of the driver of the vehicle 10 included in the image captured by the driver monitor camera 7 exists when the driver is for example operating the smartphone, gaming, etc.

Not only the mouth of the driver of the vehicle 10 included in the image captured by the driver monitor camera 7 moves due to relaxation of facial muscles when the driver is in the sleeping state, but also the mouth of the driver of the vehicle 10 included in the image captured by the driver monitor camera 7 moves when the driver is for example making a call using the smartphone, mobile phone, etc.

Not only the driver fighting off drowsiness included in the image captured by the driver monitor camera 7 touches the face with the driver's hand when the driver is in the strongly drowsy state, but also the driver included in the image captured by the driver monitor camera 7 may touch the face with the driver's hand when the driver is viewing the movie using the tablet terminal etc.

Not only the facial movement like nodding of the driver of the vehicle 10 included in the image captured by the driver monitor camera 7 exists when the driver is in the sleeping state, but also the facial movement like nodding of the driver of the vehicle 10 included in the image captured by the driver monitor camera 7 may exist when the driver is for example making a call using the smartphone, the mobile phone, etc.

In view of the above-mentioned point, in the example shown in FIG. 1 and FIG. 2, the second determination part 232F performs a second determination of whether the driver of the vehicle 10 is using the electronic device (for example, operating the smartphone, viewing the movie using the tablet terminal, etc.)

In more detail, the second determination part 232F performs the second determination based on the image of the face of the driver of the vehicle 10 captured by the driver monitor camera 7 and, for example, behavioral feature information showing a difference between a behavioral feature of the driver when the driver of a general vehicle is in the sleeping state or strongly drowsy state and a behavioral feature of the driver when the driver is using the electronic device. The behavioral feature information is, for example, generated in advance in experiments etc. and, for example, is stored in the memory 22 etc.

The behavioral feature of the driver when the driver of for example the general vehicle is in the sleeping state or strongly drowsy state included in the behavioral feature information includes, for example, the head of the driver being tilted backward, the driver greatly and quickly shaking the driver's head to fight off drowsiness, the driver breathing deeply, an action of the driver corresponding to a microsleep event (for example, the head of the driver jerking sharply), and the relaxation of the facial muscles of the driver (as a result, facial expression of the driver becomes slack).

The behavioral feature of the driver when the driver of for example the general vehicle is using the electronic device included in the behavioral feature information include, for example, upper eyelids of the driver moving up and down when the driver follows text displayed on a screen of the electronic device with the driver's eyes (for example, when silently reading text etc.), the neck of the driver moving to the left and right when the driver follows the text displayed on the screen of the electronic device with the driver's eyes, only one of right shoulder and left shoulder of the driver moving to the left and right when the driver holds the electronic device with one of right hand and left hand of the driver and operates the electronic device with the other of the right hand and the left hand of the driver (for example, at the time of texting, at the time of scrolling, at the time of swiping, etc.), the mouth of the driver moving along with speech (for example calling etc.) of the driver, and the facial expression of the driver changing for example at the time of gaming, the time of viewing the movie, etc.

The second determination part 232F has the function of detecting the facial orientation of the driver of the vehicle 10 in the image captured by the driver monitor camera 7.

The second determination part 232F determines whether the head of the driver of the vehicle 10 is tilted backward based on the results of detection of the facial orientation of the driver of the vehicle 10. When the head of the driver of the vehicle 10 is tilted backward, the second determination part 232F determines that driver of the vehicle 10 is not using the electronic device, but is in the sleeping state or strongly drowsy state more easily than when the head of the driver of the vehicle 10 is not tilted backward.

Further, the second determination part 232F determines whether the driver of the vehicle 10 is greatly and quickly shaking the driver's head to fight off drowsiness based on the results of detection of the facial orientation of the driver of the vehicle 10. When the driver of the vehicle 10 is greatly and quickly shaking the driver's head, the second determination part 232F determines that the driver of the vehicle 10 is not using the electronic device, but is in the strongly drowsy state more easily than when the driver of the vehicle 10 is not greatly and quickly shaking the driver's head.

Furthermore, the second determination part 232F determines that the action of the driver of the vehicle 10 corresponds to the microsleep event (for example, the head of the driver jerking sharply) based on the results of detection of the facial orientation of the driver of the vehicle 10. When the action of the driver of the vehicle 10 corresponds to the microsleep event (i.e., when the head of the driver jerks sharply), the second determination part 232F determines that the driver of the vehicle 10 is not using the electronic device, but is in the sleeping state more easily than when the action of the driver of the vehicle 10 does not correspond to the microsleep event (i.e., when the head of the driver does not jerk sharply).

Further, the second determination part 232F has the function of detecting the vertical movement of the right shoulder and the left shoulder of the driver of the vehicle 10 in the image captured by the driver monitor camera 7.

The second determination part 232F determines that the driver is breathing deeply based on the results of detection of the vertical movement of the right shoulder and the left shoulder of the driver of the vehicle 10. When the driver of the vehicle 10 is breathing deeply, the second determination part 232F determines that the driver of the vehicle 10 is not using the electronic device, but is in the strongly drowsy state more easily than when the driver of the vehicle 10 is not breathing deeply.

Furthermore, the second determination part 232F has the function of detecting a change of the facial expression of the driver of the vehicle 10 in the image captured by the driver monitor camera 7.

The second determination part 232F has the function of determining whether the facial muscles of the driver are relaxed based on the results of detection of the change of the facial expression of the driver of the vehicle 10. When the facial muscles of the driver are relaxed, the second determination part 232F determines that the driver of the vehicle 10 is not using the electronic device, but is in the sleeping state more easily than when the facial muscles of the driver are not relaxed.

Furthermore, the second determination part 232F has the function of detecting a change of distance between eyebrows and upper eyelids of the driver of the vehicle 10 in the image captured by the driver monitor camera 7.

When the distance between the eyebrows and the upper eyelids of the driver of the vehicle 10 changes, the second determination part 232F determines that the driver of the vehicle 10 is using the electronic device more easily (i.e., the second determination part 232F deduces that the driver of the vehicle 10 is following the text displayed on the screen of the electronic device with the driver's eyes more easily) than when the distance between the eyebrows and the upper eyelids of the driver of the vehicle 10 does not change.

As the specific technique for determination whether the distance between the eyebrows and the upper eyelids of the driver of the vehicle 10 changes, for example, it is determined that the distance between the eyebrows and the upper eyelids of the driver of the vehicle 10 changes (in more detail, there are repeated fine changes) when the change of the distance of 0.5 mm or more is observed more than once in a predetermined time period such as 10 seconds.

Furthermore, the second determination part 232F has the function of detecting repetition of movement in the horizontal direction of the facial orientation of the driver of the vehicle 10 in the image captured by the driver monitor camera 7.

When the movement in the horizontal direction of the facial orientation of the driver of the vehicle 10 is repeated, the second determination part 232F determines that the driver of the vehicle 10 is using the electronic device more easily than when the movement in the horizontal direction of the facial orientation of the driver of the vehicle 10 is not repeated (i.e., the second determination part 232F deduces that the neck of the driver of the vehicle 10 is moving left and right when the driver is following text displayed on the screen of the electronic device with the driver's eyes more easily).

As the specific technique for determination of whether the movement in the horizontal direction of the facial orientation of the driver of the vehicle 10 is repeated, for example, it is determined that the movement in the horizontal direction of the facial orientation of the driver of the vehicle 10 is repeated when repeated movement in the horizontal direction of the facial orientation of the driver of the vehicle 10 is observed two times or more in a predetermined time period such as 10 seconds.

Furthermore, the second determination part 232F has the function of detecting left-right asymmetry of the positions and movement of the right shoulder and the left shoulder of the driver of the vehicle 10 in the image captured by the driver monitor camera 7.

When the positions and movement of the right shoulder and the left shoulder of the driver of the vehicle 10 are left-right asymmetric, the second determination part 232F determines that the driver of the vehicle 10 is using the electronic device more easily (i.e., the second determination part 232F deduces that the driver of the vehicle 10 is holding the electronic device with one of the right hand and the left hand of the driver and operating the electronic device with the other of the right hand and the left hand of the driver more easily) than when the positions and movement of the right shoulder and the left shoulder of the driver of the vehicle 10 are not left-right asymmetric.

As the specific technique for determination of whether the positions and moving of the right shoulder and the left shoulder of the driver of the vehicle 10 are left-right asymmetrical, for example the following technique is used. First, a histogram showing the distance in the three-directional space of the left shoulder with respect to the right shoulder of the driver of the vehicle 10 within a certain time (for example, a window of time moving in the most recent 30 seconds) is made. Regarding the feature point of the right shoulder, the center of the right shoulder joint or any point forming the right shoulder may be made the feature point of the right shoulder. Further, any point of the clothes near the right shoulder may be made the feature point of the right shoulder. Regarding the feature point of the left shoulder, same way as above method of identification of the right shoulder is used. Then, it is determined that the positions and movement of the right shoulder and the left shoulder of the driver of the vehicle 10 are left-right asymmetrical when a change in the distance between the left shoulder and the right shoulder with respect to the mode (reference distance) exceeding, for example, 5 mm and then returning to the reference distance is observed two times or more within a predetermined time such as 10 seconds.

Furthermore, the second determination part 232F has a lipreading analysis function of analyzing movement of the mouth of the driver of the vehicle 10 in the image captured by the driver monitor camera 7.

When the second determination part 232F analyzes that the driver of the vehicle 10 is speaking, the second determination part 232F determines that the driver of the vehicle 10 is using the electronic device more easily (i.e., the second determination part 232F deduces that the driver of the vehicle 10 is using the electronic device for calling more easily) than when the second determination part 232F analyzes that the driver of the vehicle 10 is not speaking.

As the specific technique for analysis of whether the driver of the vehicle 10 is speaking, for example, it is analyzed that the driver of the vehicle 10 is speaking when mouth opening state and mouth closing state of the driver of the vehicle 10 are detected several times within 30 seconds or other predetermined time.

Further, the second determination part 232F has the function of using a facial action coding system (FACS) to detect the facial expression of the driver of the vehicle 10.

When the second determination part 232F uses the facial action coding system to detect a change in the facial expression of the driver of the vehicle 10, the second determination part 232F determines that the driver of the vehicle 10 is using the electronic device more easily than when the second determination part 232F does not detect the change in the facial expression of the driver of the vehicle 10 (i.e., the second determination part 232F deduces that the facial expression of the driver of the vehicle 10 changed more easily when the driver of the vehicle 10 is gaming using the electronic device, when the driver of the vehicle 10 is viewing a movie, etc.)

In the example shown in FIG. 1 and FIG. 2, the second determination part 232F combines the results of detection of the facial orientation of the driver of the vehicle 10 in the image captured by the driver monitor camera 7, the results of detection of the vertical movement of the right shoulder and left shoulder of the driver of the vehicle 10, the results of detection of the change of the facial expression of the driver of the vehicle 10 (the facial muscles being relaxed or not), the results of detection of the change of the distance between the eyebrows and the upper eyelids of the driver of the vehicle 10, the results of detection of the repetition of the movement in the horizontal direction of the facial orientation of the driver of the vehicle 10, the results of detection of the left-right asymmetry of the positions and movement of the right shoulder and the left shoulder of the driver of the vehicle 10, the results of lipreading analysis of the movement of the mouth of the driver of the vehicle 10, the results of detection of the facial expression of the driver of the vehicle 10 using the facial action coding system to thereby perform the second determination of whether the driver of the vehicle 10 is using the electronic device.

In more detail, the second determination part 232F performs the second determination when the vehicle control part 232A is performing the autonomous driving control of the level enabling the driver of the vehicle 10 to use the electronic device and when the first determination part 232E determines that there is the possibility of the driver of the vehicle 10 being in the sleeping state or strongly drowsy state.

Further, the second determination part 232F takes a longer time than a time spent on the first determination by the first determination part 232E and performs the second determination when the first determination part 232E determines that there is the possibility of the driver of the vehicle 10 being in the sleeping state or strongly drowsy state.

The warning part 232G makes the HMI 8 issue a warning showing cancellation of the autonomous driving control of the level enabling the driver of the vehicle 10 to use the electronic device (for example, a warning showing cancellation of the autonomous driving of the level 3 defined by the SAE) when the first determination part 232E determines that there is the possibility of the driver of the vehicle 10 being in the sleeping state or strongly drowsy state and the second determination part 232F determines that the driver of the vehicle 10 is not using the electronic device (for example, operating the smartphone, viewing the movie using the tablet terminal, etc.) (i.e., when the driver monitoring device 12 determines that the driver of the vehicle 10 is not in the available state).

Even when the first determination part 232E determines that there is the possibility of the driver of the vehicle 10 being in the sleeping state or strongly drowsy state, when the second determination part 232F determines that the driver of the vehicle 10 is using the electronic device (for example, operating the smartphone, viewing the movie using the tablet terminal, etc.) (i.e., when the driver monitoring device 12 determines that the driver of the vehicle 10 is in the available state), the warning part 232G does not make the HMI 8 issue the warning showing the cancellation of the autonomous driving control of the level enabling the driver of the vehicle 10 to use the electronic device (for example, the warning showing the cancellation of the autonomous driving of the level 3 defined by the SAE). For this reason, the driver of the vehicle 10 can continue using the electronic device.

More specifically, in the example shown in FIG. 1 and FIG. 2, the second determination is performed by the second determination part 232F. Accordingly, it is possible to reduce the possibility of false warning showing the cancellation of the autonomous driving control being issued (i.e., it can be suitably determined whether the driver of the vehicle 10 is in the available state) when the autonomous driving control of the level enabling the driver of the vehicle 10 to use the electronic device is performed and when the driver of the vehicle 10 is using the electronic device.

Figure 4:
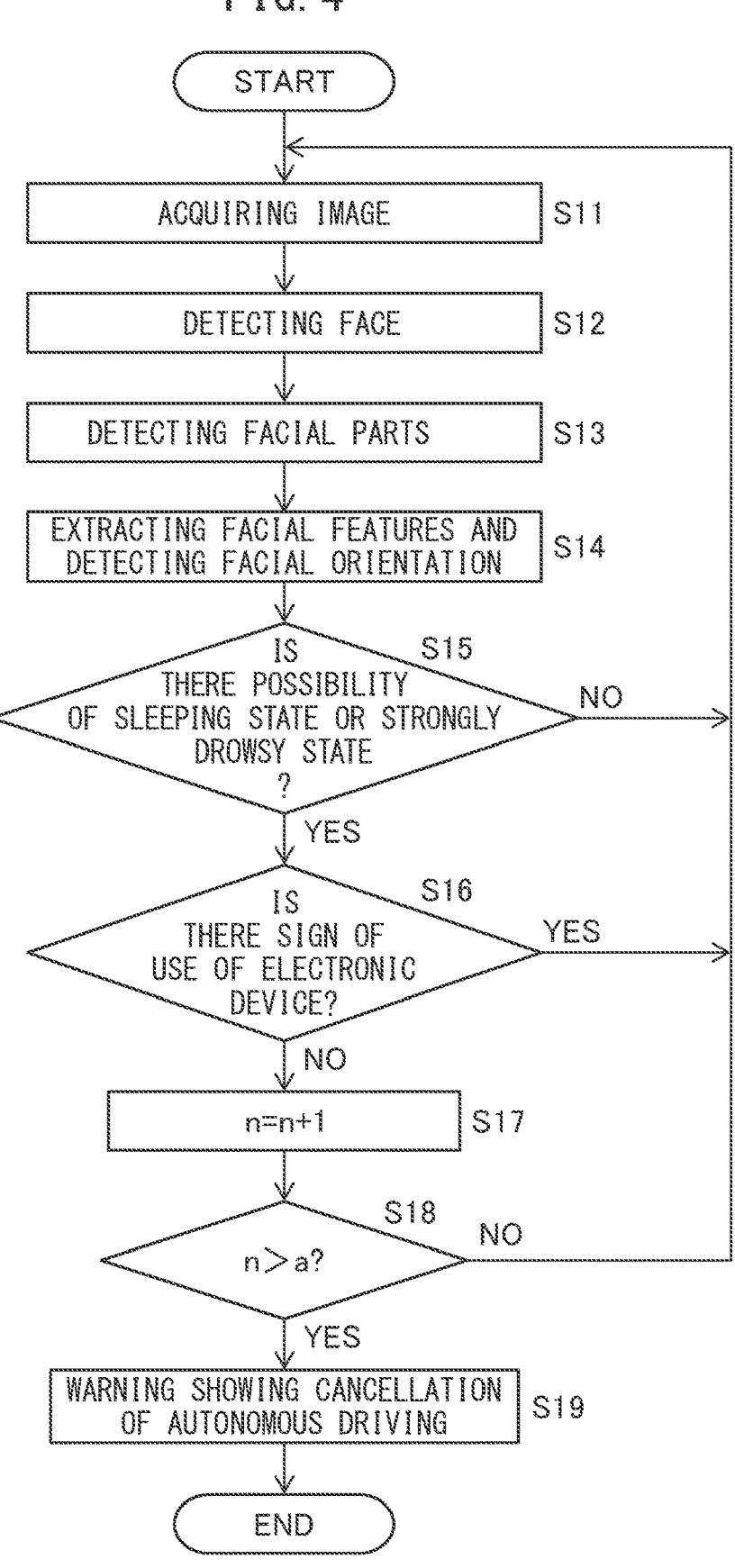
FIG. 4 is a flow chart for explaining one example of processing performed by a processor 23 of the driver monitoring device 12 of the first embodiment.

FIG. 4 is a flow chart for explaining one example of processing performed by the processor 23 of the driver monitoring device 12 of the first embodiment.

In the example shown in FIG. 4, when the autonomous driving control of the vehicle 10 of the level enabling the driver of the vehicle 10 to use the electronic device is performed by the vehicle control part 232A, the processing shown in FIG. 4 is performed.

When the processing shown in FIG. 4 is started, at step S11, the image acquisition part 231C of the acquisition part 231 acquires the image including the face of the driver of the vehicle 10 captured by the driver monitor camera 7.

At step S12, the facial detection part 232B detects the face of the driver of the vehicle 10 included in the image acquired at step S11.

At step S13, the facial part detection part 232C detects the facial parts from the face of the driver of the vehicle 10 detected at step S12.

At step S14, the facial features extraction part 232D extracts the facial features from the face of the driver of the vehicle 10 detected at step S12. Further, the facial features extraction part 232D uses the results of processing at step S13 to detect the facial orientation of the driver of the vehicle 10.

At step S15, the first determination part 232E determines whether there is the possibility of the driver of the vehicle 10 being in the sleeping state or strongly drowsy state based on the results of detection of the facial orientation of the driver of the vehicle 10 at step S14 etc. When there is the possibility of the driver of the vehicle 10 being in the sleeping state or strongly drowsy state, it proceeds to step S16, while when there is no possibility of the driver of the vehicle 10 being in the sleeping state or strongly drowsy state, it returns to step S11.

At step S16, the second determination part 232F determines whether there is a sign that the driver of the vehicle 10 is using the electronic device. In more detail, the second determination part 232F determines that there is the sign that the driver of the vehicle 10 is using the electronic device based on the image including the face of the driver of the vehicle 10 acquired at step S11, the results of detection of the facial orientation of the driver of the vehicle 10 at step S14, and for example the behavioral feature information showing the difference between the behavioral feature of the driver when the driver of the general vehicle is in the sleeping state or strongly drowsy state and the behavioral feature of the driver when the driver is using the electronic device. When there is the sign that the driver of the vehicle 10 is using the electronic device, it proceeds to step S17, while when there is no sign that the driver of the vehicle 10 is using the electronic device, it returns to step S11.

At step S17, the second determination part 232F increments a counter "n" for counting the time showing the sign that the driver of the vehicle 10 is using the electronic device ($n=n+1$).

At step S18, the second determination part 232F determines whether the counter "n" is larger than a threshold value "a". When the counter "n" is larger than the threshold value "a", the second determination part 232F determines that the driver of the vehicle 10 is using the electronic device and proceeds to step S19. On the other hand, when the counter "n" is not larger than the threshold value "a", it still cannot be determined whether the driver of the vehicle 10 is using the electronic device (i.e., it is necessary to take more time to accurately determine whether the driver of the vehicle 10 is using the electronic device), so it returns to step S11.

At step S19, the warning part 232G makes the HMI 8 issue the warning showing the cancellation of the autonomous driving control of the level enabling the driver of the vehicle 10 to use the electronic device (for example, the warning showing the cancellation of the autonomous driving of the level 3 defined by the SAE).

As explained above, in the driver monitoring device 12 of the first embodiment, even when it is determined by the first determination part 232E that there is the possibility of the driver of the vehicle 10 being in the sleeping state or strongly drowsy state, when it is determined by the second determination part 232F that the driver of the vehicle 10 is using the electronic device, the warning showing the cancellation of the autonomous driving control of the level enabling the driver of the vehicle 10 to use the electronic device is not issued to the driver of the vehicle 10.

For this reason, in the driver monitoring device 12 of the first embodiment, when the autonomous driving control of the level enabling the driver of the vehicle 10 to use the electronic device is performed and when the driver of the vehicle 10 is using the electronic device, it is possible to reduce the possibility of false warning showing the cancellation of the autonomous driving control being issued to the driver of the vehicle 10.

Second Embodiment

The vehicle 10 to which the driver monitoring device 12 of the second embodiment is applied is configured in the same way as the above-mentioned vehicle 10 to which the driver monitoring device 12 of the first embodiment is applied except for the points explained later.

In the driver monitoring device 12 of the second embodiment, in the same way as the above-mentioned driver monitoring device 12 of the first embodiment, the second determination part 232F performs the second determination based on the image of the face of the driver of the vehicle 10 captured by the driver monitor camera 7 and for example the behavioral feature information showing the difference between the behavioral feature of the driver when the driver of the general vehicle is in the sleeping state or strongly drowsy state and the behavioral feature of the driver when the driver is using the electronic device.

As explained above, in the driver monitoring device 12 of the first embodiment, the behavioral feature of for example the driver of the general vehicle when the driver is in the sleeping state or strongly drowsy state included in behavioral feature information includes, for example, the head of the driver tilting backward (first behavioral feature), the driver greatly and quickly shaking the driver's head to fight off drowsiness (second behavioral feature), the driver breathing deeply (third behavioral feature), the action of the driver corresponding to the microsleep event (for example the head of the driver jerking sharply) (fourth behavioral feature), and the relaxation of the facial muscles of the driver (as a result, the facial expression of the driver becomes slack). The behavioral feature of for example the driver of the general vehicle when the driver is using the electronic device included in behavioral feature information includes for example the upper eyelids of the driver moving up and down when the driver follows the text displayed on the screen of the electronic device with the driver's eyes (for example, when silently reading the text etc.) (sixth behavioral feature), the neck of the driver moving to the left and right when the driver follows the text displayed on the screen of the electronic device with the driver's eyes (seventh behavioral feature), only one of the right shoulder and the left shoulder of the driver moving to the left and right when the driver holds the electronic device by one of the right hand and the left hand of the driver and operates the electronic device with the other of the right hand and the left hand of the driver (for example, at the time of texting, at the time of scrolling, at the time of swiping, etc.) (eighth behavioral feature), the mouth of the driver moving along with speech of the driver (for example calling etc.) (ninth behavioral feature), and for example the facial expression of the driver changing at the time of gaming, the time of viewing the movie, etc. (10th behavioral feature).

Furthermore, in the driver monitoring device 12 of the first embodiment, the second determination part 232F combines the results of detection of the facial orientation of the driver of the vehicle 10 in the image captured by the driver monitor camera 7 (the first, second, and fourth behavioral features), the results of detection of the vertical movement of the right shoulder and the left shoulder of the driver of the vehicle 10 (the third behavioral feature), the results of detection of the change of the facial expression of the driver of the vehicle 10 (the facial muscles being relaxed or not) (the fifth behavioral feature), the results of detection of the change of the distance between the eyebrows and the upper eyelids of the driver of the vehicle 10 (the sixth behavioral feature), the results of detection of the repetition of the movement in the horizontal direction of the facial orientation of the driver of the vehicle 10 (the seventh behavioral feature), the results of detection of the left-right asymmetry of the positions and movement of the right shoulder and the left shoulder of the driver of the vehicle 10 (the eighth behavioral feature), the results of the lipreading analysis of the movement of the mouth of the driver of the vehicle 10 (the ninth behavioral feature), and the results of detection of the facial expression of the driver of the vehicle 10 using the facial action coding system (the 10th behavioral feature) to thereby perform the second determination of whether the driver of the vehicle 10 is using the electronic device.

On the other hand, in the driver monitoring device 12 of the second embodiment, when the second determination part 232F performs the second determination, not all of the results of detection (the first behavioral feature to the 10th behavioral feature) used in the driver monitoring device 12 of the first embodiment may be used.

More specifically, in the driver monitoring device 12 of the second embodiment, the second determination part 232F combines at least two of the results of detection among the results of detection of the facial orientation of the driver of the vehicle 10 in the image captured by the driver monitor camera 7 (the first, second, and fourth behavioral features), the results of detection of the vertical movement of the right shoulder and the left shoulder of the driver of the vehicle 10 (the third behavioral feature), the results of detection of the change of the facial expression of the driver of the vehicle 10 (the facial muscles being relaxed or not) (the fifth behavioral feature), the results of detection of the change of the distance between the eyebrows and the upper eyelids of the driver of the vehicle 10 (the sixth behavioral feature), the results of detection of the repetition of the movement in the horizontal direction of the facial orientation of the driver of the vehicle 10 (the seventh behavioral feature), the results of detection of the left-right asymmetry of the positions and movement of the right shoulder and the left shoulder of the driver of the vehicle 10 (the eighth behavioral feature), the results of the lipreading analysis of the movement of the mouth of the driver of the vehicle 10 (the ninth behavioral feature), and the results of detection of the facial expression of the driver of the vehicle 10 using the facial action coding system (the 10th behavioral feature) to thereby perform the second determination of whether the driver of the vehicle 10 is using the electronic device.

In the above way, embodiments of the driver monitoring device, driver monitoring method, and non-transitory recording medium of the present disclosure were explained referring to the drawings, but the driver monitoring device, driver monitoring method, and non-transitory recording medium of the present disclosure are not limited to the above-mentioned embodiments and can be suitably changed in a scope not departing from the gist of the present disclosure. The configurations of the examples of the embodiments explained above may also be suitably combined.

In the examples of the above-mentioned embodiments, the processing performed in the driver monitoring device 12 (autonomous driving ECU or driver's assistance ECU) was explained as software processing performed by running a program stored in the memory 22, but the processing performed at the driver monitoring device 12 may also be processing performed by hardware. Alternatively, the processing performed by the driver monitoring device 12 may also be processing combining both software and hardware. Further, a program stored in the memory 22 of the driver monitoring device 12 (program realizing functions of the processor 23 of the driver monitoring device 12) may also, for example, be provided, distributed, etc. recorded in a semiconductor memory, magnetic recording medium, optical recording medium or other such computer readable storage medium (non-transitory recording medium).

The invention claimed is:

1. A driver monitoring device comprising a processor configured to:

perform an autonomous driving control of a vehicle;

perform a first determination of whether there is a possibility of a driver of the vehicle being in a sleeping state or strongly drowsy state; and based upon the first determination that there is the possibility of the driver of the vehicle being in the sleeping state or the strongly drowsy state, perform a second determination of whether the driver is using an electronic device, wherein the processor is configured to perform the second determination based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

2. The driver monitoring device according to claim 1, wherein the processor is configured to perform the second determination while performing the autonomous driving control of a level enabling the driver to use the electronic device.

3. The driver monitoring device according to claim 1, wherein the processor is configured to perform the second determination when determining that there is the possibility of the driver being in the sleeping state or strongly drowsy state.

4. The driver monitoring device according to claim 1, wherein the processor is configured to perform the second determination taking a longer time than the time taken in the first determination when determining that there is the possibility of the driver being in the sleeping state or strongly drowsy state.

5. The driver monitoring device according to claim 1, wherein the behavioral feature of the driver when the driver is in the sleeping state or strongly drowsy state includes at least one of a head of the driver being tilted backward, the driver greatly and quickly shaking the driver's head to fight off drowsiness, the driver breathing deeply, an action of the driver corresponding to a microsleep event, and relaxation of facial muscles of the driver, and the behavioral feature of the driver when the driver is using the electronic device includes at least one of upper eyelids of the driver moving up and down when the driver follows text displayed on a screen of the electronic device with the driver's eyes, neck of the driver moving to the left or right when the driver follows the text displayed on the screen of the electronic device with the driver's eyes, only one of right shoulder and left shoulder of the driver moving to the left and right when the driver holds the electronic device with one of right hand and left hand of the driver and operates the electronic device with the other of the right hand and the left hand of the driver, a mouth of the driver moving along with speech of the driver, and facial expression of the driver changing.

6. The driver monitoring device according to claim 1, wherein the processor is configured to detect a change in the distance between eyebrows and upper eyelids of the driver in the image and, when the distance between the eyebrows and the upper eyelids of the driver in the image changes, the processor is configured to determine that the driver is using the electronic device.

7. The driver monitoring device according to claim 1, wherein the processor is configured to detect repetition of movement in the horizontal direction of facial orientation of the driver in the image and, when the movement in the horizontal direction of the facial orientation of the driver in the image is repeated, the processor is configured to determine that the driver is using the electronic device.

8. The driver monitoring device according to claim 1, wherein the processor is configured to detect left-right asymmetry of the positions and movement of right shoulder and left shoulder of the driver in the image and, when the positions and the movement of the right shoulder and the left shoulder of the driver in the image are left-right asymmetric, the processor is configured to determine that the driver is using the electronic device.

9. The driver monitoring device according to claim 1, wherein the processor is configured to analyze movement of a mouth of the driver from the image including the face of the driver and, when analyzing that the driver is speaking, the processor is configured to determine that the driver is using the electronic device.

10. The driver monitoring device according to claim 1, wherein the processor is configured to use a facial action coding system (FACS) to detect a facial expression or the driver and, when using the facial action coding system to detect a change of the facial expression of the driver, the processor is configured to determine that the driver is using the electronic device.

11. A driver monitoring method comprising:

performing an autonomous driving control of a vehicle;

performing a first determination of whether there is a possibility of a driver of the vehicle being in a sleeping state or strongly drowsy state; and based upon the first determination that there is the possibility of the driver of the vehicle being in the sleeping state or the strongly drowsy state, performing a second determination of whether the driver is using an electronic device, wherein the second determination is performed based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

12. A non-transitory recording medium having recorded thereon a computer program for causing a processor to execute a process comprising:

performing an autonomous driving control of a vehicle;

performing a first determination of whether there is a possibility of a driver of the vehicle being in a sleeping state or strongly drowsy state; and based upon the first determination that there is the possibility of the driver of the vehicle being in the sleeping state or the strongly drowsy state, performing a second determination of whether the driver is using an electronic device, wherein the second determination is performed based on an image including a face of the driver captured by a driver monitor camera and behavioral feature information showing a difference between a behavioral feature of the driver when the driver is in the sleeping state or strongly drowsy state and the behavioral feature of the driver when the driver is using the electronic device.

\* \* \* \* \*